Patented Nov. 25, 1941

2,263,552

UNITED STATES PATENT OFFICE 2,263,552

METHOD OF CONCENTRATING FLUORSPAR ORES

Carl O. Anderson, Baxter Springs, Kans., Rudolph J. Stengl, Rosiclare, Ill., and John G. Trewartha, Baxter Springs, Kans., assignors to Mahoning Mining Company, Youngstown, Ohio, a corporation of Delaware No Drawing. Application February 21, 1940, Serial No. 320,014

6 Claims. (Cl. 209—166)

Our invention relates to the concentration of fluorspar bearing ores by flotation and is especially directed to the recovery of fluorspar of a high degree of purity from ores in which it is accompanied by substantial amounts of calcareous substances such as calcite and/or other forms of calcium carbonate.

Prior to our invention it was known that recovery of "acid-grade" fluorspar, that is, material containing 97% or more $CaF_2$, could be effected by flotation from ores relatively high in silica but that its recovery from ores relatively high in calcareous material was substantially impossible by ordinary flotation methods. As a result, these ores which are found in various parts of the United States were not commercially exploited to any material extent for the production of acid-grade spar although it was recognized they would afford a desirable source of said material if a method adapted for its commercial production therefrom could be devised.

In an effort to solve this problem it was therefore proposed by Williams and Greeman in U. S. Patent 1,785,992, granted December 23, 1930, to subject the ore preparatory to its flotation for recovery of the fluorspar to a desliming treatment to remove the very finely divided material remaining in the ore after it had been crushed and ground, these patentees being of the opinion the presence of this material, much of which is of a substantially colloidal nature adapted to pass an extremely fine, say 325, mesh screen, was inimical to the subsequent flotation procedure to an extent sufficient to inhibit the recovery of acid-grade fluorspar thereby. But obviously this desliming treatment materially enhanced the cost of the product, not only because of the expense involved in the actual treatment itself but also because of the material loss of ore resulting therefrom, and for these reasons the specific procedure which they advocated or in fact any other procedure dependent for its success upon removal and consequent loss of a considerable portion of the ore as slimes cannot be deemed as desirable from a commercial standpoint as one in which this loss is not incurred as in the method of our invention now to be described.

We have discovered, contrary to the teaching of Williams and Greeman, that a desliming treatment preparatory to flotation is unnecessary and therefore may be omitted provided the water used in the flotation circuit is of a suitable character; in other words, if "soft" water be employed, and our invention depends on this discovery. We are aware these prior patentees aver that they obtained satisfactory results with water having a pH value between certain limits, but it is apparent they assigned no especial significance to the use of any particular kind or quality of water and that even when they employed a soft water they attributed the alleged success of their method entirely to the slime removal prior to flotation for the fluorspar which is the very essence of their procedure.

On the contrary, as we have pointed out, we have discovered that by the employment of soft water, i. e. one having preferably not to exceed 5 grains of hardness and, additionally, having a pH value above 6.5, desirably not exceeding approximately 8.5, no desliming treatment is required and that by flotation of the finely divided ore in the presence of such water and suitable spar concentrating and calcite depressing reagents, we are able to produce without difficulty a fluorspar concentrate containing less than 3% and generally less than 2% of ingredients other then $CaF_2$.

It will therefore be understood that a principal object of our invention is the provision of a method of flotation concentration of fluorspar from ores high in calcite by means of which acid-grade fluorspar can be commercially produced without desliming treatment preparatory to flotation of the ore.

A further object of the invention is the provision of a method of this character by means of which loss of material ore values through removal of the fines or slimes preparatory to flotation is avoided.

Another object is to provide a method of fluorspar flotation concentration from ores high in calcite in which the "middlings" can be permitted to recirculate in the circuit without material inimical effect.

Other objects, purposes and advantages of the invention will hereinafter more fully appear or be understood from the following description of one manner of performing it which we have found eminently satisfactory.

More particularly when utilizing an ore containing predominantly fluorspar ($CaF_2$) and calcite ($CaCO_3$) with the proportion of the latter relatively high, for example up to 40% and perhaps even higher, we first crush the ore until it will pass a screen of suitable mesh, say ⅛" to ¼", and thence feed it to a ball or other grinding mill where it is ground in water having a minimum amount of hardness, preferably not exceeding 5 grains, and the pH of which is desirably in the neighborhood of 8 or a little more to thereby form a pulp. If soft water is not conveniently obtainable from natural sources, the available water may be treated by known methods, such as a lime-soda or zeolite one, to bring it to the proper degree of softness, and soda ash may also be added at this point to neutralize soluble salts and thereby attain the desired pH value and to assist when the ore is mixed with the water in giving a more controllable froth, that is, one not too stiff and tough which cannot readily be broken down, but an excessive quantity of this substance should not be employed as that results in producing what is known as a "runny" froth. Sodium silicate may also be added to aid in suspending in the pulp the clay and mud and preventing these materials from adhering to the mineral surfaces.

From the ball mill the pulp may be passed to a classifier, preferably of the hydraulic type, the overflow from which is carried to the spar conditioner where additional soft water and suitable frothing and calcite depressing reagents are added preparatory to frothing the pulp in the ordinary way; if preferred some of the reagents may be added in the flotation cells instead of the spar conditioner. The froth removed from the cells is filtered and otherwise suitably treated to effect the ultimate separation of the fluorspar while the tailings from the cells are permitted to go to waste, these operations and the specific steps utilized for carrying them out forming no part of the invention.

The reagents employed for the collection of the fluorspar and depression of the gangue may be of any character adapted for the performance of their respective functions; however, because of the satisfactory results attained by their use, their cheapness and other desirable attributes, we prefer to employ a suitable higher fatty acid, that is, one such as oleic acid having more than twelve carbon atoms as a collector and frother for the spar and quebracho extract as a depressing agent for the calcite.

We are inclined to attribute the result attainable through our invention to the fact that when water having not more than about 5 grains of hardness and a pH in excess of 6.5 is employed in the flotation circuit with a higher fatty acid collector, smearing or coating of the spar particles by calcium and magnesium salts of the said fatty acid is substantially eliminated with consequent increase in the sharpness of the separation of the spar from the gangue. On the other hand, when a hard water is utilized, these salts and perhaps others resulting from reaction of the oleic acid or other soapy reagent with basic constituents of the water, especially the magnesium and calcium salts, are thrown down it a slimy or curdy mass which has a distinct affinity for the solid particles of the ore and by coating them prevents the proper separation of the spar particles from the gangue. Moreover, by our invention a saving is effected in the total amount of flotation reagents required for none of the fluorspar collector is expended in neutralizing the basic calcium or magnesium compounds in the water. We have also found that because of the absence of this coating of the fine particles with the oleic or other higher fatty acid salts, the middlings may be returned to the roughing circuit and recirculated through the system without detracting from the sharpness of the separation of the fluorspar from the gangue.

As illustrative of the practice of our invention we may refer to the flotation treatment in accordance therewith of a feed material which was shown by analysis to contain the following ingredients and proportions:

| | Per cent |
|---|---|
| $CaF_2$ | 59.65 |
| $CaCO_3$ | 13.50 |
| $SiO_2$ | 19.30 |
| $BaSO_4$ | 1.00 |

This ore was ground to about 100 mesh and the high grade fluorspar concentrate recovered by the subsequent flotation contained about 63% to 67.5% of the fluorspar in the original feed and assayed 97.5% $CaF_2$, 0.99% $CaCO_3$, 0.89% $SiO_2$, 0.13% $BaSO_4$ and 0.17% $R_2O_3$, while that part of the concentrate recovery classified as "second grade" assayed 88.3% $CaF_2$, 5.0% $CaCO_3$ and 3.1% $SiO_4$ and being suitable for metallurgical use as a flux in open hearth furnaces was retained as a by-product. In these two concentrates about 90% of the fluorspar in the feed was recovered, the high grade concentrate containing 70–75% and the second grade about 25–30% of the total, while the tailings, which assayed 11% $CaF_2$, contained only about 10% of the fluorspar in the feed.

The production of this second grade material to which we have referred is normally economically advantageous due to the fact that the feed contains fluorspar of all degrees of purity and of freedom from "locking," i. e., mechanical coherence with lime and siliceous impurities and unless the particles of fluorspar are freed from this locked condition they cannot be successfully recovered in a substantially pure state by flotation. Consequently by grinding the feed much finer than 100 mesh preparatory to flotation so as to free the maximum possible amount of fluorspar from the gangue it might be possible to enhance the percentage of high grade fluorspar recovered. Under normal conditions, however, we consider that the $CaF_2$ content of the ore can be most advantageously utilized in the manner described since the expense of the additional grinding necessary to free substantially all the fluorspar from its locked condition with the gangue is not usually justified by the additional recovery of high grade fluorspar which may thereby be effected.

While we have herein described our invention with considerable particularity we do not desire or intend to thereby restrict or confine it to the particular practices to which we have referred by way of illustration as variations and modifications thereof will readily occur to those skilled in the art and may be made if desired without departing from the spirit and scope of the invention as defined in the appended claims.

Having thus described our invention, we claim and desire to protect by Letters Patent of the United States:

1. In concentrating the fluorspar values of fluorspar ore containing substantial amounts of calcareous material, the steps of finely dividing the ore in soft water having a pH value in excess of 6.5 to thereby form a slime containing pulp, then frothing said pulp in the presence of a higher fatty acid spar collector and a calcite depressing agent and returning some of the middlings back of the flotation circuit.

2. In concentrating the fluorspar values of fluorspar ore containing substantial amounts of calcareous material, the steps of pulping the ore with soft water, then frothing the pulp and slimes in the presence of a higher fatty acid spar collector and a calcite depressing agent and returning some of the middlings back of the flotation circuit.

3. In concentrating the fluorspar values of fluorspar ore containing substantial amounts of calcareous material, the steps of pulping the ore with water having not more than about 5 grains of hardness, then frothing the pulp and slimes with oleic acid and a calcite depressing agent and returning middlings back to the flotation circuit.

4. In concentrating the fluorspar values of fluorspar ore containing substantial amounts of calcareous material to a final product including not less than 97% $CaF_2$, the steps of dry crushing the ore, then grinding the crushed ore in water having approximately 5 grains of hardness and a pH value of about 8 and without desliming the pulp thus formed subjecting it to flotation concentration in the presence of spar concentrating and calcite depressing agents and water of substantially similar hardness and pH value.

5. In the concentration of fluorspar values from ore containing fluorspar and calcite, the steps of grinding and pulping the ore with soft water to produce a pulp containing individual particles of fluorspar and calcite of the order of about −100 mesh and an appreciable proportion of slimes, agitating the pulp in soft water in a series of flotation cells in the presence of a fatty acid fluorspar flotation reagent of more than twelve carbon atoms to thereby produce fluorspar-bearing froth and middlings, removing the froth, and re-circulating the middlings in the cells.

6. In the concentration of fluorspar values from ore containing fluorspar and calcite, the steps of grinding and pulping the ore with soft water to produce a pulp containing individual particles of fluorspar and calcite of the order of about −100 mesh and an appreciable proportion of slimes, and then agitating the pulp in soft water in a series of flotation cells in the presence of a higher fatty acid fluorspar flotation reagent and quebracho extract to thereby produce a fluorspar-bearing froth substantially free of calcite.

CARL O. ANDERSON.
RUDOLPH J. STENGL.
JOHN G. TREWARTHA.

CERTIFICATE OF CORRECTION.

Patent No. 2,263,552.   November 25, 1941.

CARL O. ANDERSON, ET AL.

It is hereby certified that error appears in the printed specification of the above numbered patent requiring correction as follows: Page 2, second column, line 70, claim 1, for "of" read --to--; page 3, first column, line 2, claim 2, for "back of" read --back to--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.